Oct. 17, 1961     C. O. BRODERS     3,004,750
STATOR FOR COMPRESSOR OR TURBINE
Original Filed Aug. 20, 1956
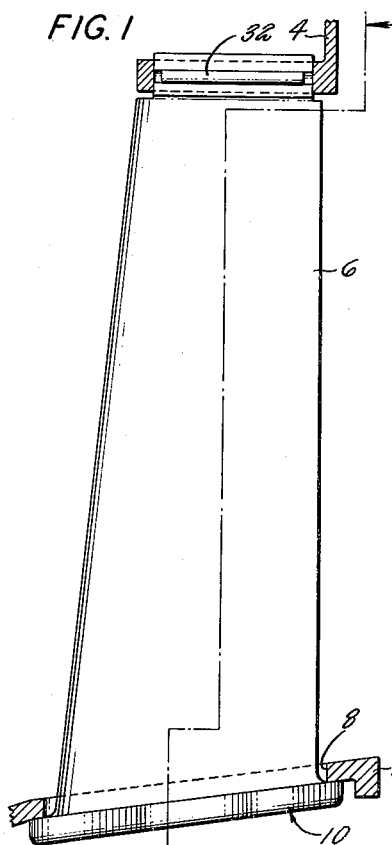
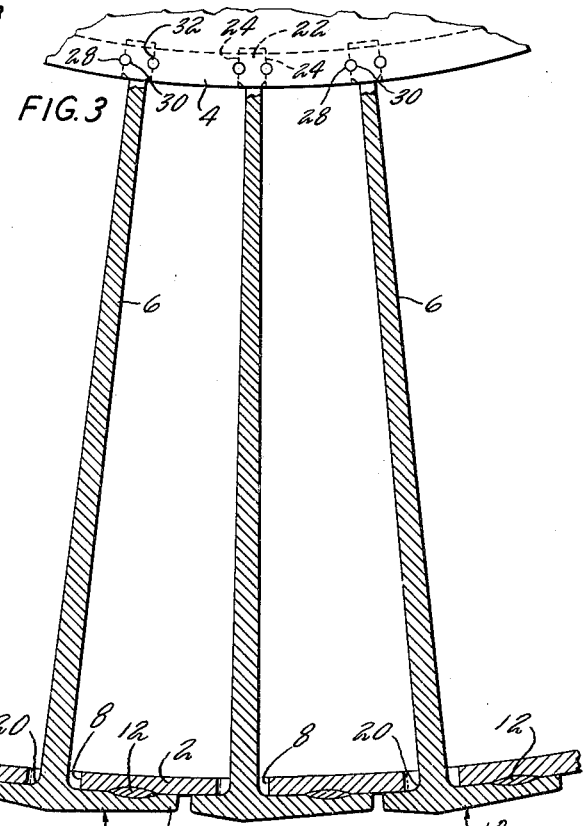
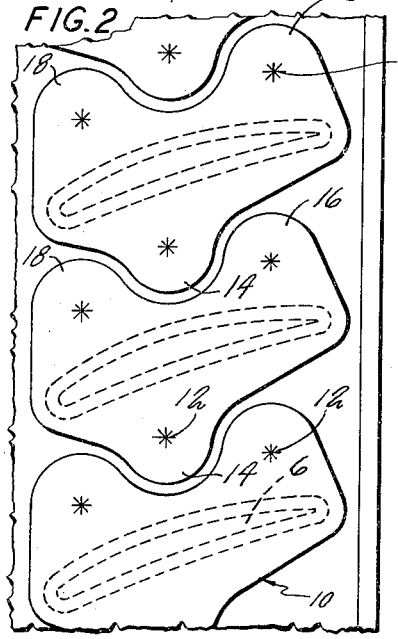
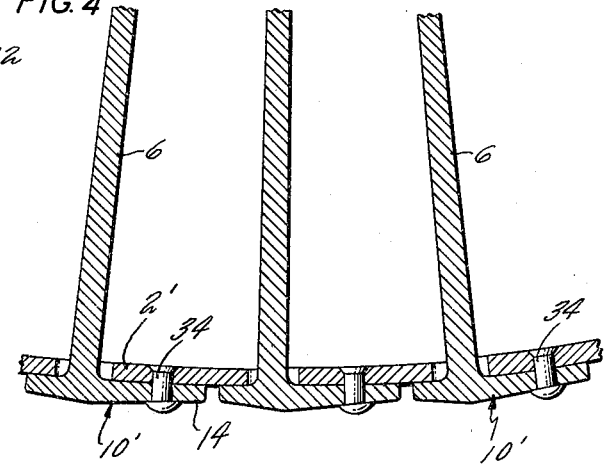
INVENTOR
CLAUDE O. BRODERS
BY
ATTORNEY

United States Patent Office 3,004,750
Patented Oct. 17, 1961

3,004,750
STATOR FOR COMPRESSOR OR TURBINE
Claude O. Broders, Simsbury, Conn., assignor to United Aircraft Corporation, East Hartford, Conn., a corporation of Delaware
Continuation of application Ser. No. 604,921, Aug. 20, 1956. This application Feb. 24, 1959, Ser. No. 795,080
9 Claims. (Cl. 253—78)

This is a continuation of applicant's co-pending application Serial No. 604,921, filed August 20, 1956, now abandoned.

This invention relates to axial flow compressors and turbines and more particularly to an attachment for the end of a stator vane to the supporting shroud.

These vanes have been attached to the supporting shrouds by various schemes, one of which involves providing slots in the shroud to receive the vane end and brazing between the vane end and the walls of the slots. This method has obvious difficulties since the slot must accurately fit the vane in order that the brazing alloy may make contact with both the shroud and the vane around the entire periphery of the vane. One feature of the present invention is a vane attachment which is relatively simple and does not require a close fit between the vane end and the slot in the shroud.

The vanes have also been secured in position by welding around the periphery of the vane where it projects through the slot but this arrangement is time consuming and requires a skilled operator in order that the welding may be successful. A further feature of the invention is an arrangement by which the vane may be attached by resistance welding or by riveting where no special skill is required.

If the shroud ring and vane are made of different alloys, as is frequently the case, neither welding nor brazing is sometimes possible. One features of the invention is an arrangement by which to provide for a secure attachment of the vane by having a foot on the end of the vane which overlies the shroud and can be attached as by riveting or by welding if the allows make welding possible.

Other features and advantages will be apparent from the specification and claims, and from the accompanying drawings which illustrate an embodiment of the invention.

FIG. 1 is a fragmentary longitudinal sectional view through a shroud ring.
FIG. 2 is a side elevation looking at the direction of the arrow 2 of FIG. 1.
FIG. 3 is a sectional view along the line 3—3 of FIG. 1.
FIG. 4 is a sectional view similar to FIG. 3 of a modification.

The vane assembly includes an outer shroud 2 and an inner shroud 4 concentric thereto. Vanes 6 extend between the shrouds and are supported by the shroud in predetermined relation to each other and in a generally radial position as shown in FIG. 3.

The outer shroud 2 has a plurality of slots 8 therein which receive the outer ends of the vanes 6. As best shown in FIG. 2, the slot 8 is larger than the vane end in order that the vane will fit loosely therein. Each vane is airfoil shape in cross section and has a foot 10 on the outer end which overlies the outer surface of the outer shroud and is attached to the shroud at spaced points as by spot welds 12, FIG. 3. Each foot has a central projection 14 at one side of the vane, preferably at the concave side, and spaced projections 16 and 18 at the other side of the vane. The projection 14 on one vane foot extends between the projections 16 and 18 on the next adjacent foot. By providing these projections as in FIG. 2, it is possible to have a large enough area for the foot at each weld point to permit the conventional resistance welding or spot welding equipment to be used. The inner surface of the foot 10 is substantially flat, having preferably only enough curvature to contact the outer shroud over the entire area of the foot. The foot also is large enough to extend beyond the slot or opening 8 in all directions.

As best shown in FIG. 3, the junction between the vane and its integral foot is provided with a substantial fillet 20 in order to reduce the stress concentration at this point as a result of the pressure loading on the vanes during operation. Since the slot 8 is larger than the vane it will be apparent that the surface of the foot on the vane can engage smoothly with the outer surface of the shroud since the slot will accommodate the fillet on the vane.

The inner end of the vane may be held in position by any suitable fastening means but is preferably held in position by the spring pin arrangement described and claimed in the Brown application Serial No. 604,940, filed August 20, 1956. In this arrangement, the vane has an inner end enlargement 22 which has parallel radially extending sides 24 and which fits within a similarly shaped slot 26 in the inner shroud. The shroud and the vane enlargement have cooperating semi-cylindrical grooves 28 and 30 which oppose each other when the vanes and shroud are assembled so that a cylindrical opening is formed half in the vane and half in the inner shroud, and this opening receives a spring pin 32. This pin functions to damp vibrations in the vane and also to provide a controlled resilience for retaining the vane within the inner shroud.

Instead of welding the outer end foot on the vane to the outer shroud, it may be desirable, as shown in FIG. 4, to rivet the foot 10' to the shroud ring 2'. The rivets 34 are in the same relative position on the vane foot as are the welds of FIG. 2 and function to support the vane foot in the same manner as the welds. The projections on the foot provide a large enough area to accommodate the rivets and to make the riveting operation easy since the rivets are not directly in contact with the vane proper.

It is to be understood that the invention is not limited to the specific embodiment herein illustrated and described, but may be used in other ways without departure from its spirit as defined by the following claims.

I claim:

1. In a stator construction, inner and outer shroud rings, and vanes extending between said rings, one end of each vane having an integral foot thereon substantially larger in area that the cross section of the vane and projecting beyond the vane in all directions within the plane of the foot and having a substantially flat surface on the side from which the vane extends, the associated shroud ring having an opening therein substantially the shape of and larger than the vane and in which the vane is positioned out of contact with the walls of the opening, the substantially flat surface of said foot engaging with the side of said shroud ring remote from the other ring and being permanently attached thereto.

2. In a stator construction, inner and outer shroud rings, and vanes extending between said rings, one end of each vane having a foot thereon substantially larger in area than the cross section of the vane and having a substantially flat surface on the side from which the vane extends, the associated shroud ring having an opening therein substantially the shape of the vane and in which the vane is positioned, the opening for the vane being larger than the vane and smaller than the foot, and said vane and foot having a fillet at the junction between the foot and vane, said vane being positioned in said opening but out of contact with the walls thereof, said foot engaging with the side of the shroud ring remote from the other ring, and said foot extending beyond the opening at all points on the periphery of the opening.

3. In a stator construction, inner and outer shroud rings, and vanes extending between said rings, one end of each vane having an integral foot thereon substantially larger in area than the cross section of the vane and having a substantially flat surface on the side from which the vane extends, the associated shroud ring having an opening therein substantially the shape of and larger than the vane and in which the vane is positioned out of contact with the opening, said foot being substantially larger than said opening and overlying and engaging with the surface of said shroud on all sides of said opening, said foot being welded to the shroud at points spaced from the vane opening.

4. In a stator construction, inner and outer shroud rings, and vanes extending between said rings, each vane having a concave side, one end of each vane having an integral foot thereon substantially larger in area than the cross section of the vane and having a substantially flat surface on the side from which the vane extends, the associated shroud ring having an opening therein substantially the shape of the vane and in which the vane is positioned, said foot being substantially larger than said opening and overlying and engaging the surface of the shroud on all sides of the opening, said foot having a projection substantially centrally of the edge adjacent to the concave side of the vane and a notch centrally on the opposite edge of the foot, said foot being welded to said shroud at points spaced from the opening.

5. In a stator construction, inner and outer shroud rings, and vanes extending between said rings, one end of each vane having an integral foot thereon substantially larger in area than the cross section of the vane and having a substantially flat surface on the side from which the vane extends, the associated shroud ring having an opening therein substantially the shape of the vane and in which the vane is positioned, said foot being substantially larger than said opening and overlying and engaging the surface of the shroud, said foot having a projection substantially centrally of the edge adjacent to one side of the vane and a notch centrally of the opposite edge defining projections on said foot, each foot being welded to said shroud at points on said projections spaced from the opening.

6. In a stator construction, inner and outer shroud rings, and vanes extending between said rings, each vane having a concave side, one end of each vane having an integral foot thereon substantially larger in area than the cross section of the vane and having a substantially flat surface on the side from which the vane extends, the associated shroud ring having an opening therein substantially the shape of the vane and in which the vane is positioned, said foot being substantially larger than said opening and overlying and engaging the surface of the shroud, said foot having a projection substantially centrally of the edge adjacent to the concave side of the vane and a notch centrally on the opposite edge of the foot, the notch in one foot receiving the projection on the adjacent vane foot when a set of vanes is assembled, each foot being welded to said shroud at points spaced from the opening.

7. In a stator construction, inner and outer shroud rings, and vanes extending between said rings, said outer ring having slots therein to receive said vanes, each vane having an integral foot on the outer end substantially larger than the associated slot in the shroud ring and overlying and engaging the outer surface of said outer shroud ring on all sides of said slot, said foot being permanently attached to said outer shroud ring at points spaced from the vane slot and means engaging said vane and inner shroud ring for securing the inner end of the vane to the inner shroud ring.

8. In a stator construction, inner and outer shroud rings, and vanes extending between said rings, said outer ring having slots therein to receive said vanes, each vane having an integral foot on the outer end substantially larger than the associated slot in the shroud ring and overlying and engaging the outer surface of said outer shroud ring on all sides of the slot, said foot being substantially larger in area than the slot in the outer shroud ring, said foot having opposite edges spaced circumferentially from the vane, each foot having a projection substantially centrally of one of said edges and spaced projections on the opposite edge defining therebetween a centrally located notch such that the projection on one foot fits in the notch in the adjacent foot, said foot being attached at said projections to said outer shroud ring at points spaced from the vane slot, said inner shroud ring having slots therein and said vanes having extensions thereon fitting in the slots in the inner shroud ring, and means connecting each vane to the inner shroud ring for retaining said vanes in said inner shroud ring.

9. In a stator construction, inner and outer shroud rings, vanes extending between said rings, said outer ring having openings therethrough to receive the vanes, each vane having an integral foot on the outer end substantially larger than the associated vane opening and overlying and engaging the outer surface of said outer shroud ring on all sides of said slot, each slot being larger than the vane received therein and each vane being spaced from the walls of said slot, each foot having opposite edges spaced circumferentially from the vane and each foot having a projection substantially centrally of one of said edges and a notch substantially centrally of the opposite edge such that the notch on one foot receives therein the projection on the adjacent foot, each foot being permanetly attached to the outer shroud at points spaced from the underlying slot.

References Cited in the file of this patent

UNITED STATES PATENTS

| 2,337,619 | Miller | Dec. 28, 1953 |
| 2,685,405 | Stalker | Aug. 3, 1954 |

FOREIGN PATENTS

| 225,221 | Switzerland | Apr. 16, 1943 |
| 572,859 | Great Britain | Oct. 26, 1945 |
| 599,391 | Great Britain | Mar. 11, 1948 |
| 891,422 | France | Dec. 11, 1943 |